United States Patent [19]

Akhteruzzaman

[11] Patent Number: 5,754,644
[45] Date of Patent: May 19, 1998

[54] METHOD FOR CUSTOMIZING OPERATION OF A BATTERY FEED CIRCUIT IN A TELECOMMUNICATIONS NETWORK

[75] Inventor: Akhteruzzaman, Naperville, Ill.

[73] Assignee: Lucent Technologies Inc., Murray Hill, N.J.

[21] Appl. No.: 672,189

[22] Filed: Jun. 27, 1996

[51] Int. Cl.$^6$ .................................................. H04M 19/00
[52] U.S. Cl. .......................... 379/413; 379/399; 379/324
[58] Field of Search ............................... 379/413, 399, 379/377, 379, 382, 324, 340, 383, 387

[56] References Cited

U.S. PATENT DOCUMENTS

| | | | |
|---|---|---|---|
| 4,490,580 | 12/1984 | Nagashima | 379/379 |
| 4,511,763 | 4/1985 | Skidanenko et al. | 379/413 |
| 4,652,701 | 3/1987 | Cubbison, Jr. | 379/373 |
| 5,596,637 | 1/1997 | Pasetti et al. | 379/399 |
| 5,636,273 | 6/1997 | Schopfer et al. | 379/377 |
| 5,640,451 | 6/1997 | Schopfer | 379/413 |

*Primary Examiner*—Krista Zele
*Assistant Examiner*—Jacques M. Saint-Surin
*Attorney, Agent, or Firm*—Mony R. Ghose

[57] ABSTRACT

A method for controlling power losses associated with the operation of line interface circuits in telecommunications networks comprises detecting a loop current of at least one subscriber loop interconnected to at least one line interface circuit. The detected loop current is used to access a threshold voltage value from a line interface circuit database. A threshold voltage based on the threshold voltage value retrieved from the database is compared to a feedback voltage to control a duty cycle of a switching converter circuit in the line interface circuit. Controlling the duty cycle of the switching converter circuit enables control of battery voltages based on the comparison of the threshold voltage and the feedback voltage. In the preferred embodiment, the battery voltage is controlled to be a minimum voltage needed to provide a predetermined magnitude of the minimum loop current.

7 Claims, 3 Drawing Sheets

METHOD FOR CUSTOMIZING OPERATION OF A BATTERY FEED CIRCUIT IN A TELECOMMUNICATIONS NETWORK

CROSS-REFERENCE TO RELATED APPLICATION

This application is related to the applications of Akhteruzzaman entitled "Method For Controlling Power Losses Associated With Line Interface Circuits In Telecommunications Networks" and "Method For Customizing Operation Of A Line Interface Circuit In A Telecommunications Network", which applications are assigned to the assignee of the present application, and are being filed concurrently herewith.

TECHNICAL FIELD

This invention relates to line interface circuits and, more particularly, to supplying power to battery feed circuits in such line interface circuits deployed in telecommunications networks.

BACKGROUND OF THE INVENTION

Line interface circuits (LIC) interconnect customer premises equipment to central office switches by subscriber lines (commonly referred to as "subscriber loops"). For administrative purposes, a plurality of LICs are grouped in an integrated line services unit (ISLU). A LIC includes means for delivering current to a subscriber loop, and an external power source. In modern LICs, the means for delivering current to the subscriber loop is a battery feed circuit comprising a complex set of integrated circuits. Voltage generated by the external power source, is processed by a LIC switching converter circuit before delivery to the battery feed circuit. The power delivered to the subscriber loop by the battery feed circuit enables a serving central switch to detect the presence, and status, of customer premises equipment served by the loop. The battery feed circuit also couples audio signals transmitted by the central office switch to the customer premises equipment, and vice versa. Power supplied to the switching converter circuit is processed by a transformer which produces a predetermined battery voltage ($V_{bat}$). The predetermined voltage is established to provide adequate current to interconnect customer premises equipment to a central office switch when appropriate, and to provide high quality voice transmission to the subscriber loop.

It is well known that normal LIC operation results in the dissipation of power due to losses associated with internal LIC components. Particularly, a substantial amount of power is lost at the battery feed circuit. Although losses associated with individual LICs might be tolerable, the accumulation of LIC losses (due to the large number of LICs deployed in a single ISLU) significantly impacts the overall efficiency of a central office switch. For this reason, controlling LIC power losses is of critical importance to telecommunications service providers. Although cooling devices are frequently employed to control power losses, these devices are expensive to operate, and require a non-trivial amount of space.

Therefore, there is a need in the art for controlling power losses associated with the operation of LICs in telecommunications networks.

SUMMARY OF THE INVENTION

This need is addressed and technological advance is achieved in the art by substantially controlling the battery voltage supplied to a battery feed circuit in a LIC according to subscriber loop length.

The electrical resistance of a subscriber loop is directly proportional to the geographical distance of its associated customer premises equipment from a serving central office switch. Customer premises equipment located relatively near the serving central office switch has a shorter subscriber loop (and hence, lower resistance) than customer premises equipment located a great distance (higher resistance) from the switch. Due to a smaller total resistance, short subscriber loops do not require as much voltage to generate the needed amount of current as do longer subscriber loops to interconnect customer premises equipment to the serving central office switch.

In accordance with the preferred embodiment of the present invention, each LIC detects a loop current ($I_{loop}$) of its associated subscriber loop, and uses the detected loop current to determine a threshold voltage ($V_{th}$). The threshold voltage affects the value of the customized battery feed voltage ($V_{bat}$) supplied to the battery feed circuit of the LIC. More particularly, the loop current is detected by a current detector in the battery feed circuit, and is detected by a digital signal processor (DSP). The DSP uses the loop current as an index to access a threshold voltage database. The threshold voltage affects a duty cycle of the LIC switching converter circuit to produce an optimum battery feed voltage to be supplied to the battery feed circuit. The optimum battery feed voltage is just sufficient to produce the correct amount of current necessary to interconnect the customer premises equipment to the central office switch, and provide telecommunications service. By providing the optimum battery feed voltage, the dissipation of power is minimized for short subscriber loops, and the overall efficiency of the serving central office switch is enhanced.

DETAILED DESCRIPTION

Figure 1:
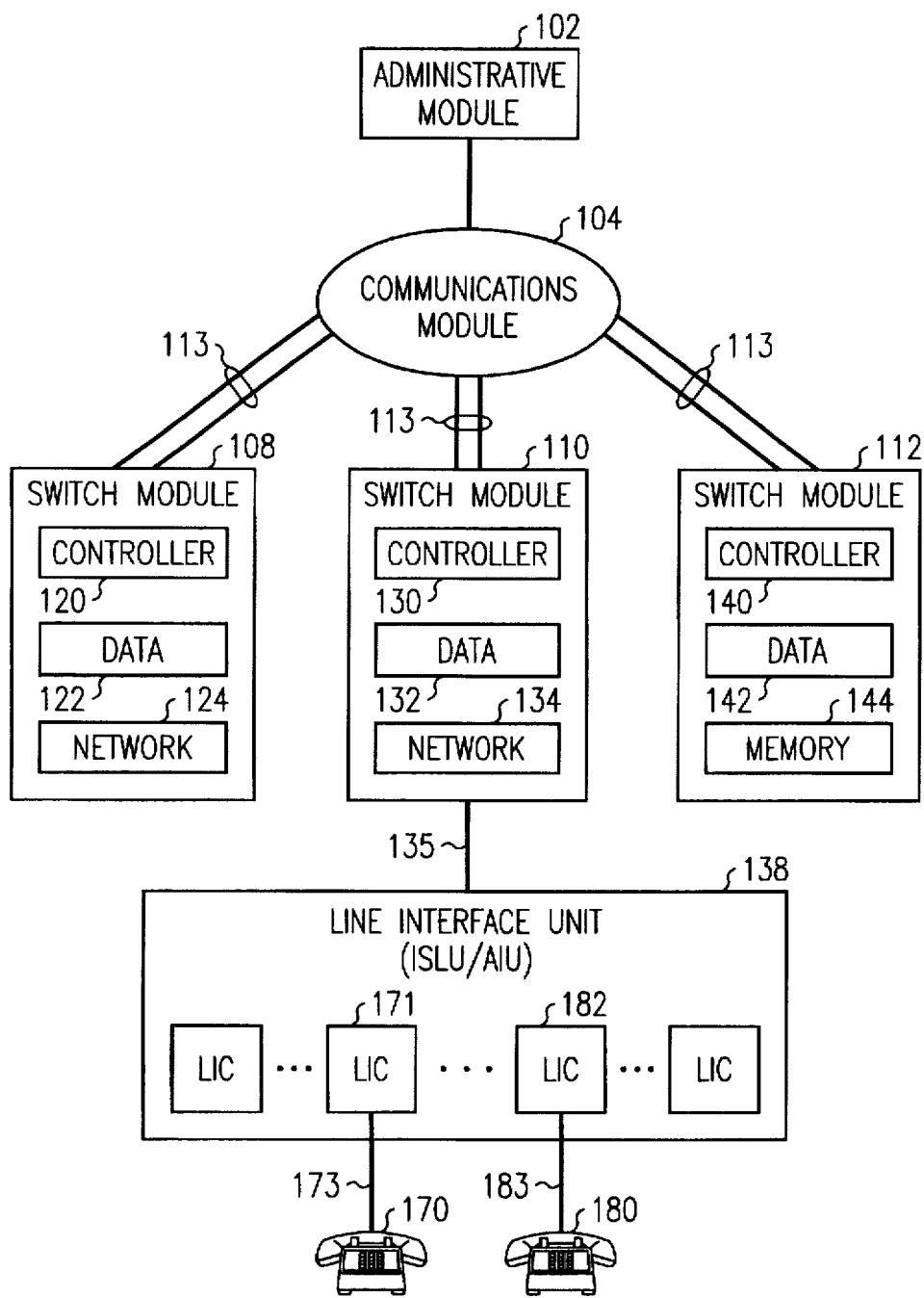
FIG. 1 is a block diagram of a central office switch in which the present invention may be practiced.

FIG. 1 shows a simplified block diagram of a central office telecommunications switch 100 (hereinafter, switch 100). In the preferred embodiment, switch 100 is the 5ESS® manufactured, and sold, by Lucent Technologies. Although a central office switch is shown, any system in which power is supplied to subscriber loops may be utilized.

Switch 100 includes three major components: administrative module 102 for providing system-wide administration, maintenance, and resource allocation; communications module 104 for serving as a distribution hub in switching voice, control information, and synchronization signals; and a plurality of switching modules (SM) 108, 110 and 112 for performing local switching and control functions. Communication among the elements of central office switch 100 is accomplished over network control and timing (NCT) links 113. As required by convention, dual NCT links are shown for the interconnection of each SM to communications module 104.

SMs 108, 110 and 112 include controllers for coordinating switching functions, memory for retaining specific subscriber line data, and network elements for routing calls to, and from, individual subscriber lines. In the embodiment shown, switch module 108 comprises controller 120, data memory 122, and network element 124. Similarly, switch module 110 includes controller 130, data memory 132, and network element 134. Switch module 112 comprises controller 140, data memory 142, and network element 144.

Each SM is equipped with an ISLU, also known as an access interface unit (AIU), for interconnecting each subscriber loop to the network element of the SM. Although an operational central office switch includes many ISLUs, a single ISLU is shown for clarity. Particularly, ISLU 138, comprised of a plurality of LICs, is interconnected to network element 134 of switch module 110 via link 135. Each subscriber loop served by switch 100 is interconnected to a network element via a particular LIC and ISLU. In this example, telephone 170 is interconnected to LIC 171 via subscriber line 173, and telephone 180 is interconnected to LIC 182 via subscriber line 183.

Figure 2:
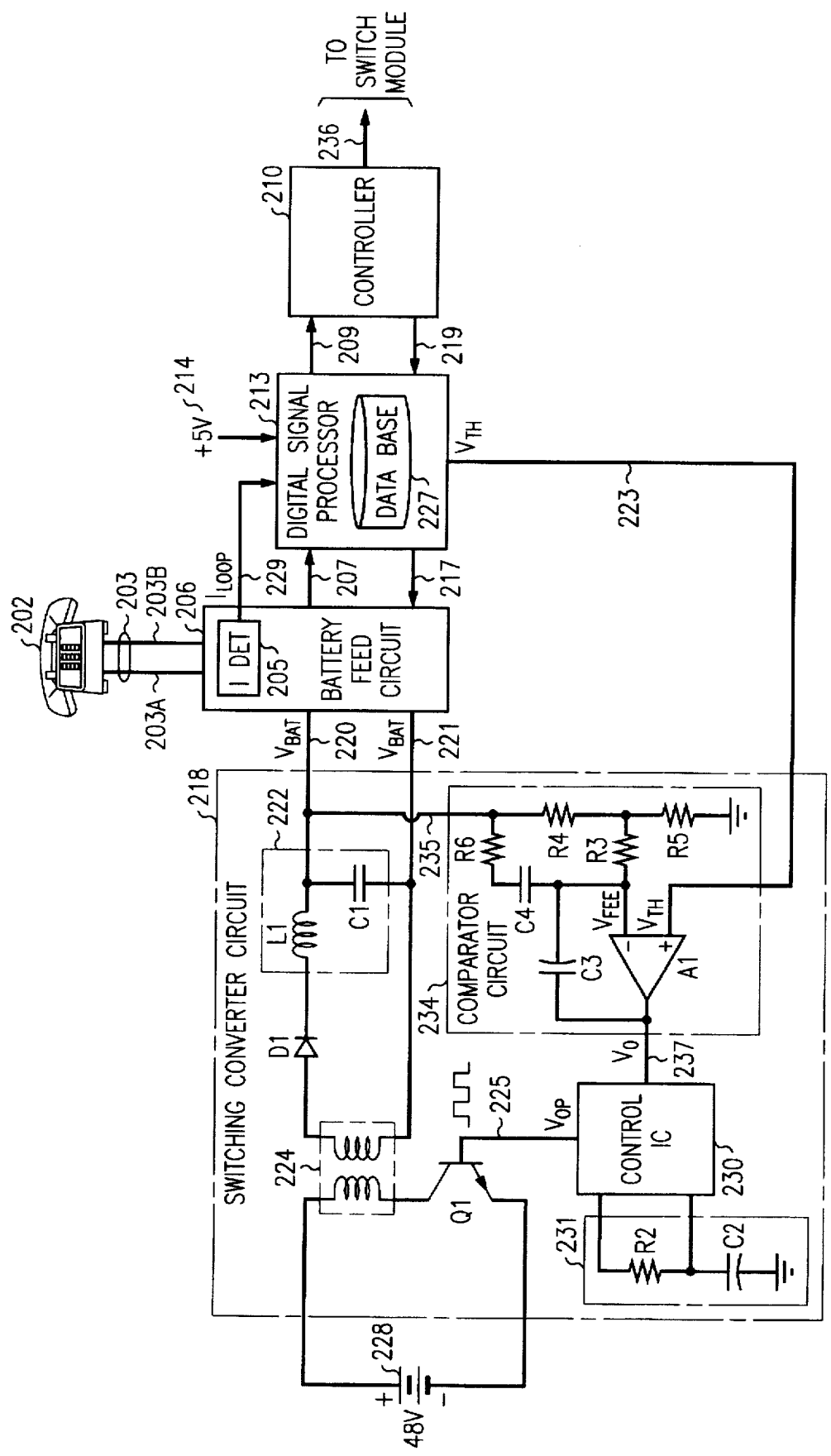
FIG. 2 is a block diagram of a LIC in accordance with a preferred embodiment of the present invention.

FIG. 2 is a detailed diagram of a preferred embodiment of a LIC in which the present invention may be practiced. In this embodiment, LIC 200 interconnects telephone 202 to a switch module of a central office switch, such as switch 100. The interconnection of subscriber line 203 to the central office switch enables the detection, and transmission of audio signals from telephone 202 to the central office switch. In this example, telephone 202 is interconnected to LIC 200 via subscriber loop 203 comprising "tip" line 203A, and "ring" line 203B. Both tip and ring lines have first ends terminating at telephone 202, and second ends connected to battery feed circuit 206.

DSP 213 translates audio signals received from telephone 202 via battery feed circuit 206 and link 207 into digital format before delivering these signals to main controller 210 over link 209. Conversely, digital signals received from the switch module via link 219 are converted to analog format prior to delivery to battery feed circuit 206 over link 217. Signals between main controller 210 and the switching module of the serving central office switch are exchanged over signaling link 236.

DSP 213 is powered by 5 volt power supply 214, and produces threshold voltage $V_{th}$. More particularly, DSP 213 receives the loop current ($I_{loop}$) associated with subscriber loop 203 from battery feed circuit 206 over link 229. Loop current ($I_{loop}$) is equivalent to the current in tip line 203A, or ring line 203B. In the preferred embodiment, the loop current is detected by current detector 205 of battery feed circuit 206. As is well-known in the art, $I_{loop}$ is proportional to the electrical resistance of the subscriber loop. DSP 213 also includes voltage database 227 for storing a table of threshold voltages ($V_{th}$) correlated by loop current values. In alternative embodiments, database 227 stores an algorithm for determining threshold voltage using loop current.

Switching converter unit 210 receives power (−48 volts) from external power source 228 to supply voltage to battery feed circuit 206 via links 220 and 221. In the preferred embodiment, the switching converter circuit includes: transformer circuit 224; filter 222; switching transistor Q1; application-specific integrated circuit (ASIC) controller 230; frequency selection circuit 231 and feedback/comparator circuit 234. In this embodiment, transformer circuit 224 is designed to provide voltages ranging from −39.5 volts to −60 volts. Diode D1 rectifies the output of transformer circuit 224, as is known in the art. Filter 222, comprised of conductor L1 and capacitor C1, serves to smooth the output voltage of transformer circuit 224, and meet ripple requirements. ASIC controller 230 produces output voltage Vop for operating switching transistor Q1, as described below. Feedback/comparator circuit 234 includes amplifier A1, capacitor $C_3$, $C_4$ and resistors R3, R4, R5 and R6.

In accordance with the preferred embodiment of the present invention, the loop current of subscriber loop 203 is detected by current detector 205 of battery feed circuit 206. The detected loop current is received in digital signal processor 213 via link 229, and is used as an index to access a threshold voltage value from database 227. Upon determination of the threshold voltage ($V_{th}$) value, digital signal processor 213 uses internal processing to deliver an analog output $V_{th}$ to an input of amplifier A1 in comparator circuit 234 via signaling link 223.

Comparator circuit 234 compares threshold voltage $V_{th}$ at the first input of amplifier A1 to feedback voltage $V_{fee}$ at a second input of amplifier A1. Feedback voltage $V_{fee}$ is the voltage is detected at lead 220 and is delivered to comparator circuit 234 via link 235. Resistors R3, R4, R6 and capacitor C4 act as a voltage divider to attenuate $V_{fee}$. As known in the art, comparator circuit 234 seeks to equalize threshold voltage $V_{th}$ with feedback voltage $V_{fee}$. The output of amplifier $A_1$ is voltage $V_O$ which is extended to ASIC controller 230 over link 237. ASIC controller 230 uses voltage $V_O$ to produce operating voltage $V_{op}$. The frequency of operating voltage $V_{op}$ is controlled by frequency selection circuit 231, which is composed of resistor R2 and capacitor C2. Operating voltage $V_{op}$ controls the switching frequency of transistor Q1, and therefore determines the value of battery feed voltage $V_{bat}$. In accordance with the preferred embodiment, $V_{th}$ is chosen to alter the duty cycle of switching converter circuit 218. Selectively altering the duty cycle of the switching converter circuit enables the control of battery feed voltages. In another preferred embodiment, the loop voltage of subscriber loop 203 is the threshold voltage which is applied to the first input of amplifier $A_1$ of comparator circuit 234. In other words, no database look-up is required.

Figure 3:
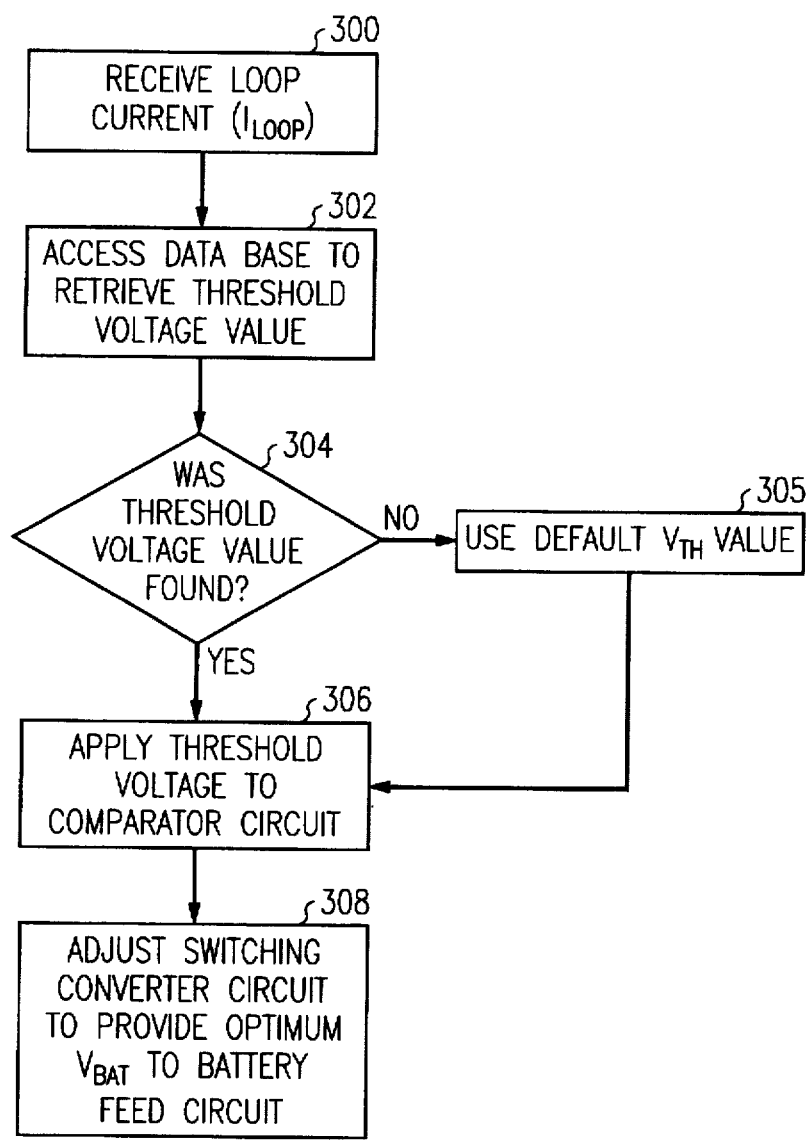
FIG. 3 is a flow diagram of the steps performed in a LIC in accordance with the preferred embodiment of the method of the present invention.

FIG. 3 illustrates steps performed in accordance with a preferred embodiment of the method of the present invention. For purposes of example, assume the steps described below are implemented by LIC 200 for serving telephone 202. The process begins in step 300 in which digital signal processor 213 receives a loop current value from battery feed circuit 206 over link 229.

The process continues to step 302 in which digital signal processor 213 uses the received loop current value as an index to access a database to retrieve a threshold voltage associated with a received loop current. In this embodiment, digital signal processor 213 uses $I_{loop}$ to access a table in previously initialized database 227 for determining threshold voltage $V_{th}$. In alternative embodiments, an algorithm may be used to determine threshold voltage $V_{th}$ from the detected loop current. The threshold voltage $V_{th}$ specified in database 227 is chosen to alter the duty cycle of switching converter circuit in order to obtain a battery feed voltage customized to subscriber loop length. In other words, a minimum battery feed voltage is provided so that it results in a just sufficient amount of current provided to the subscriber loop. In the preferred embodiment, the battery feed voltage ranges from −39.5 volts to −60 volts. The range of current provided to subscriber loops is 10 milliamps to 40 milliamps. In decision step 304, the digital signal processor determines whether a threshold voltage $V_{th}$ was found in the database. In a rare circumstance, the loop current detected by the digital signal processor may not have a corresponding threshold voltage. If the outcome of decision step 304 is a "NO" determination, the process continues to step 305 in which the digital signal processor applies a default threshold voltage to comparator circuit 234. In this embodiment, the default threshold voltage results in switching converter circuit 218 providing a $V_{bat}$ of approximately −55 volts to battery feed circuit 206. The default battery feed voltage is enough to provide sufficient current to interconnect customer premises equipment of most subscriber loops to the serving central office switch. If the outcome of decision step 304 is a "YES" determination, the process continues to step 306 in which the digital signal processor applies a voltage which equals the retrieved threshold voltage $V_{th}$ to a comparator circuit. In this embodiment, digital signal processor 213 applies threshold voltage $V_{th}$ to comparator circuit 234 over signaling link 223. In step 308, comparator circuit 234 uses threshold voltage $V_{th}$ to produce output voltage $V_O$. Output voltage $V_O$ determines the duty cycle of switching converter circuit 218, and has a direct impact on battery feed voltage $V_{bat}$ as described above.

The battery feed voltage of each LIC is tailored for providing the minimum amount of voltage needed to send a predetermined magnitude of loop current to the subscriber loop. Advantageously, short subscriber loops are not provided with the same amount of current as longer subscriber loops, and thereby, resulting in power savings for the central office switch. While the invention has been particularly illustrated and described with reference to the preferred embodiment, alternative embodiments may be devised by those skilled in the art without departing from the scope of the invention.

I claim:

1. A method for enhancing the efficiency of power usage of individual line interface circuits (LIC) connected to a plurality of subscriber loops comprises the steps of:

detecting a loop current of at least one subscriber loop;

using the loop current to access a threshold voltage database including a plurality of threshold voltage values, each threshold voltage value customized for a particular subscriber loop length;

comparing a threshold voltage to a feedback voltage; and controlling a battery voltage based on the comparison of the threshold voltage and the feedback voltage to cause the battery voltage to be a minimum needed for a particular subscriber loop.

2. The method of claim 1 wherein detecting a loop current of a subscriber loop comprises the step of:

using a current detector to continuously monitor loop current.

3. The method of claim 1 further comprising the step of:

generating a threshold voltage based on the threshold voltage value obtained from the database.

4. The method of claim 1 further comprising the step of:

using an algorithm to derive a threshold voltage value from the loop current; and generating a threshold voltage based on the derivation.

5. The method of claim 1 wherein the step of controlling a battery voltage based on the comparison of the threshold voltage and the feedback voltage comprises the step of:

altering a duty cycle of a switching converter circuit to cause the battery voltage to be a minimum voltage needed to provide a predetermined magnitude of a minimum loop current.

6. A telecommunications line interface circuit (LIC) comprises;

a battery feed circuit for transmitting messages between customer premises equipment (CPE), and a main controller;

a switching converter circuit coupled between a DC power source and the battery feed circuit, the switching converter circuit having an output voltage coupled to the battery feed circuit; and a voltage database for storing a table of threshold voltages correlated by loop currents for controlling the output of voltage of the switching converter circuit so as to minimize power losses.

7. A method for decreasing power losses associated with individual line interface circuits (LIC) interconnected to a plurality of subscriber loops comprises the steps of:

detecting a loop current of at least one subscriber loop;

using the loop current to generate a threshold voltage based on a value obtained from a threshold voltage database including threshold voltage values customized by subscriber loop length; and applying the threshold voltage to a comparator circuit for controlling a battery voltage based on the comparison of the threshold voltage and a feedback voltage to cause the battery voltage to be a minimum voltage needed to provide a predetermined magnitude of the minimum loop current.

* * * * *